US005193062A

United States Patent [19]

Murase et al.

[11] Patent Number: 5,193,062

[45] Date of Patent: Mar. 9, 1993

[54] AUTOMATIC VEHICLE DRIVING SYSTEM AND METHOD OF DRIVING THE SAME ON CHASSIS DYNAMOMETER

[75] Inventors: Isao Murase; Akira Shimozono, both of Yokosuka, Japan

[73] Assignee: Nissan Motor Co., Ltd., Yokohama, Japan

[21] Appl. No.: 647,025

[22] Filed: Jan. 29, 1991

[30] Foreign Application Priority Data

Feb. 7, 1990 [JP] Japan ................................. 2-28009

[51] Int. Cl.⁵ .............................................. G06F 15/20
[52] U.S. Cl. ........................... 364/426.04; 364/426.01; 73/117
[58] Field of Search ............... 73/117, 862.18, 125, 73/126, 128, 129, 132, 116, 123, 127, 130, 862.13, 862.16; 123/352, 360, 361; 364/426.04, 550, 551.01, 426.01, 579, 580

[56] References Cited

U.S. PATENT DOCUMENTS

| 3,712,126 | 1/1973 | Campbell | 73/117 |
|---|---|---|---|
| 3,713,332 | 1/1973 | Herrbrich | 73/117 |
| 4,442,708 | 4/1984 | Gable et al. | 73/117 |
| 4,621,525 | 11/1986 | King et al. | 73/117 |
| 4,656,576 | 4/1987 | Kawarabayashi | 73/117 X |
| 4,771,387 | 9/1988 | Hexel et al. | 73/132 X |
| 4,831,868 | 5/1989 | Makino | 73/126 X |
| 4,870,584 | 9/1989 | Etoh et al. | 364/426.04 |
| 4,870,585 | 9/1989 | Manzolini | 73/117 X |
| 4,905,544 | 3/1990 | Ganoung | 364/424.1 X |
| 4,935,873 | 6/1990 | Ishizeki | 364/551.01 X |
| 5,036,700 | 8/1991 | Knestel | 73/117 |
| 5,051,909 | 9/1991 | Gomez et al. | 364/431.05 |
| 5,101,660 | 4/1992 | LaBelle | 73/117 |
| 5,119,304 | 6/1992 | Seki | 364/579 X |

Primary Examiner—Parshotam S. Lall
Assistant Examiner—Thomas S. Auchterlonie
Attorney, Agent, or Firm—Foley & Lardner

[57] ABSTRACT

In an automatic test vehicle driving system on a chassis dynamometer, a table between accelerator actuator stroke and engine output torque and a table between engine friction loss power and engine speed are formed and stored by teaching operation before vehicle travel test. During travel test, command accelerator actuator strokes are determined with reference to the formed stroke-torque table when the test vehicle is accelerated or kept at a constant speed to reduce setting time for each test vehicle. Further, it is determined whether vehicle speed can be decelerated by only engine brake or by depression of brake pedal with reference to the formed friction loss power-engine speed table to prevent unnecessary braking operation. Since engine output torque can be determined in open-loop control, complicated control gain adjustment setting work can be eliminated.

15 Claims, 15 Drawing Sheets

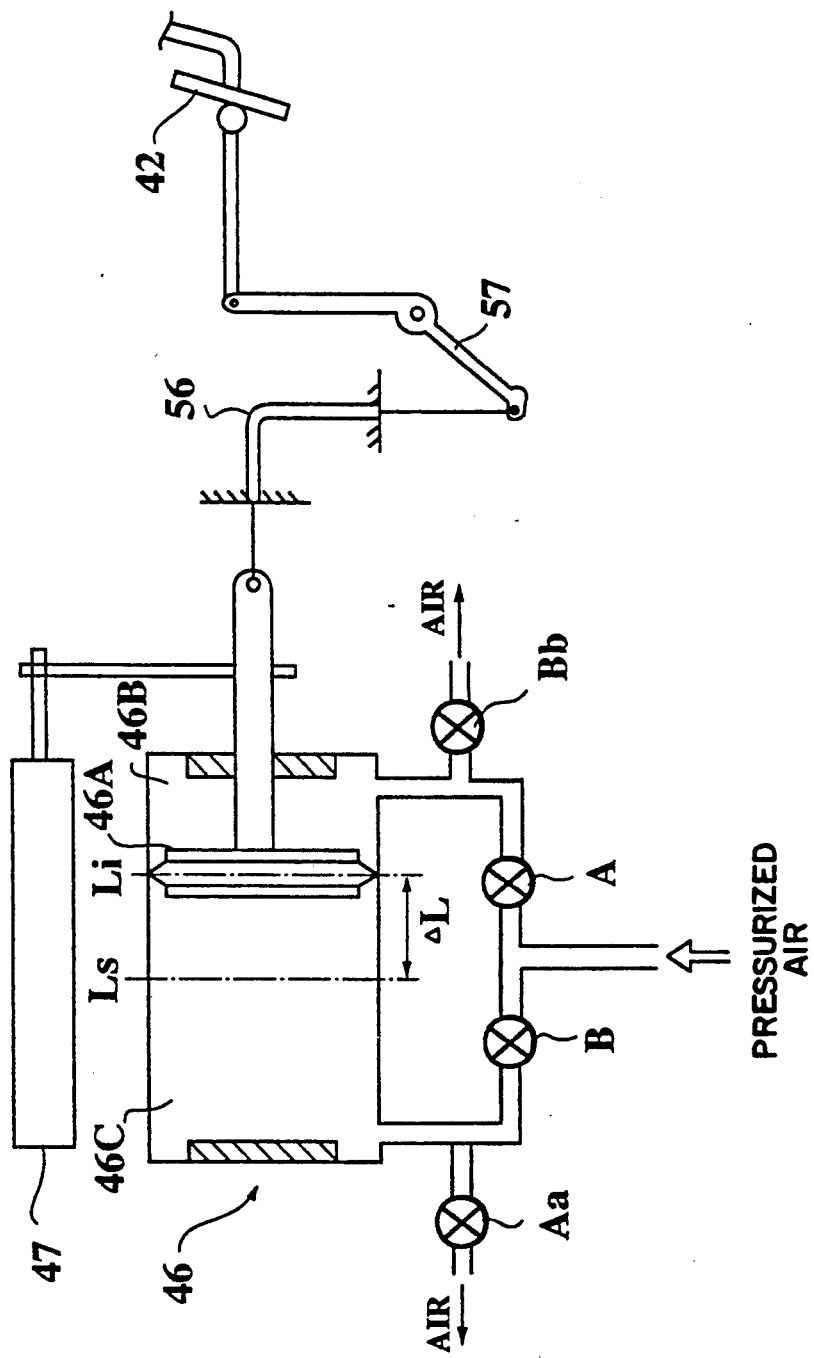
FIG.1 (c) PRIOR ART

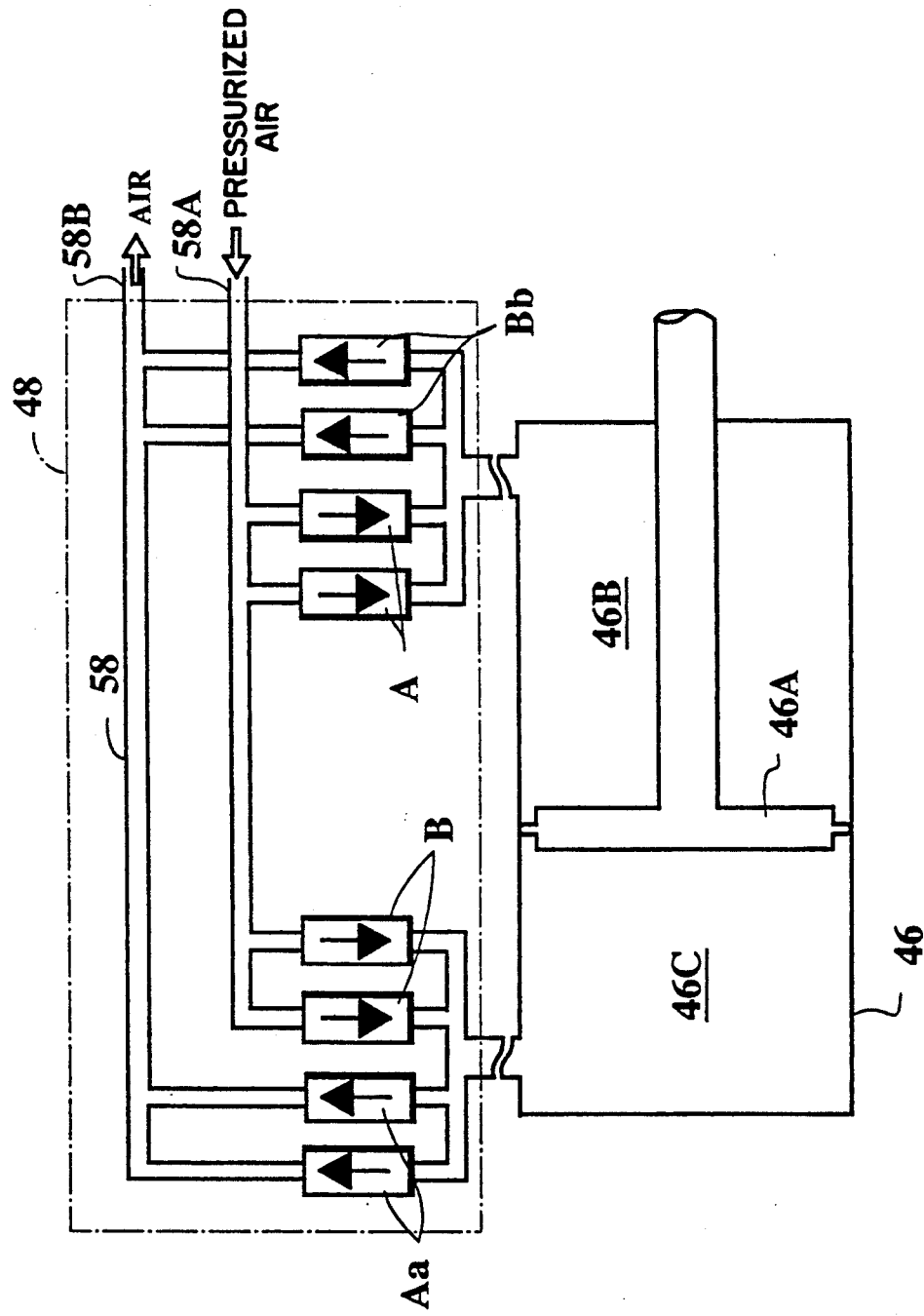
FIG.1 (d) PRIOR ART

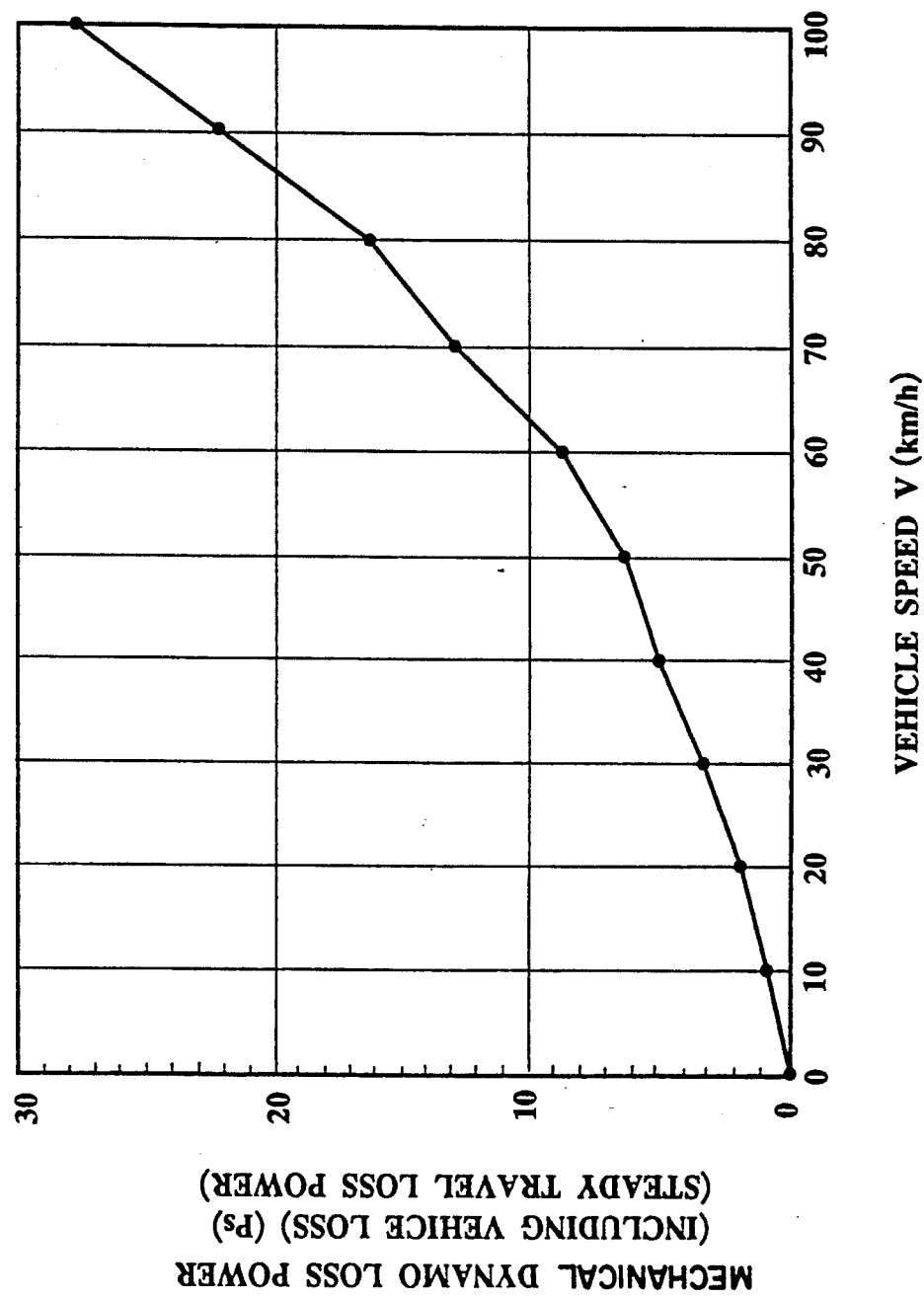

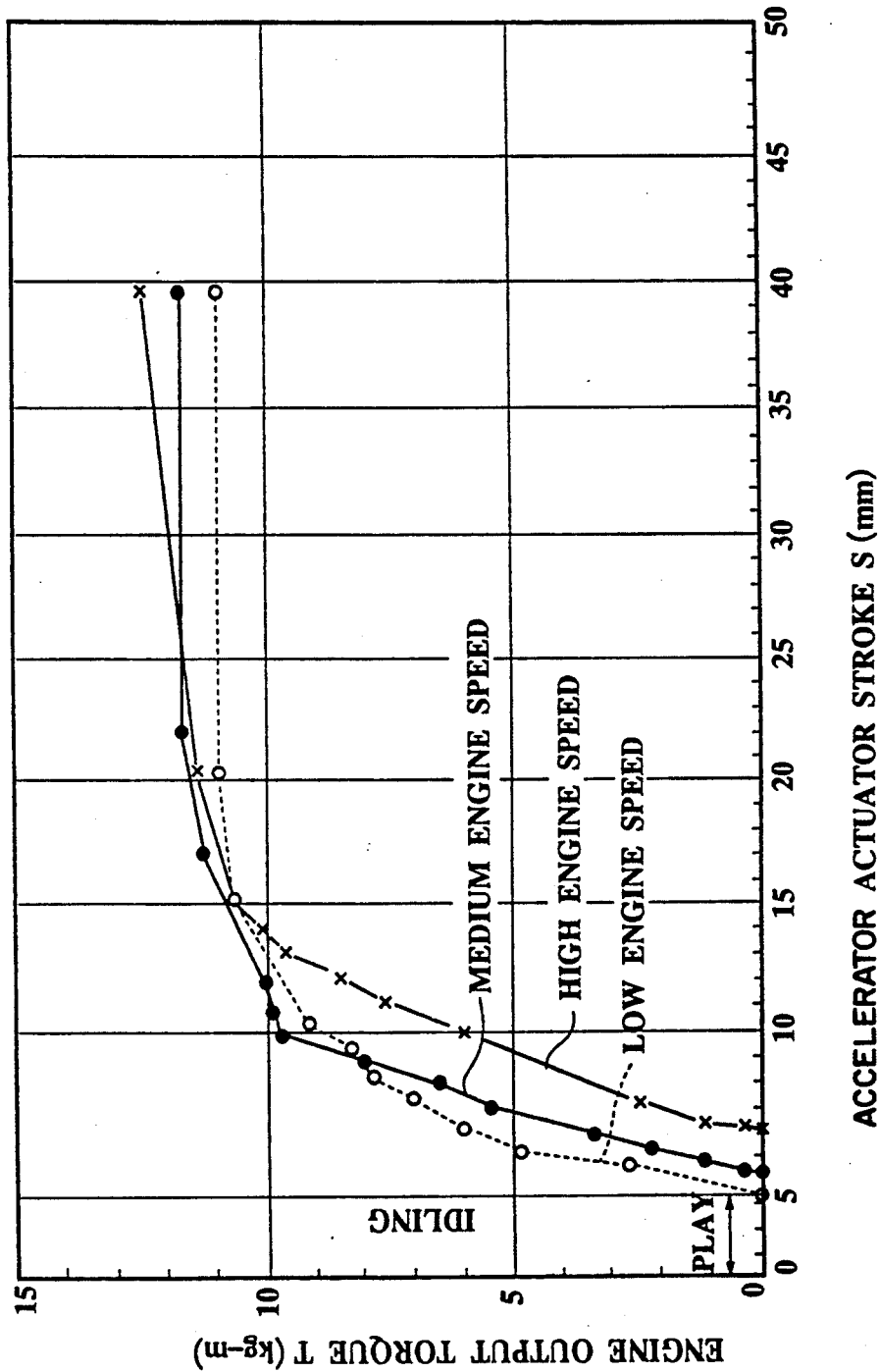

(AUTOMATIC TRANSMISSION)

AUTOMATIC VEHICLE DRIVING SYSTEM AND METHOD OF DRIVING THE SAME ON CHASSIS DYNAMOMETER

BACKGROUND OF THE INVENTION

1. Field of the Invention

The present invention relates to an automatic vehicle driving system and a method of driving the same, and more specifically to a system and a method of driving a test vehicle placed on a chassis dynamometer via an accelerator actuator. Here chassis dynamometer is used to measure engine power of a test vehicle whose front or rear driving wheels are placed on two opposing rollers, in order to realize the same conditions as at the outdoor driving test. In this specification, "accelerator" is referred to as "accel" simply, hereinafter.

2. Description of the Prior Art

The chassis dynamometer is used to measure exhaust gas components, fuel consumption rate, etc. of a test vehicle placed on the chassis dynamometer rollers. Therefore, it is preferable to drive the test vehicle by an automatic vehicle driving system provided with air cylinders small in size, light in weight, and easy to be connected to or disconnected from the test vehicle. An example of the prior-art automatic vehicle driving system is disclosed in Transactions No. 862, October, 1986 by JAPANESE AUTOMOBILE TECHNOLOGY ASSOCIATION.

This prior-art driving system will be described hereinbelow with reference to FIGS. 1(a) to (d). The system comprises an actuator composed of plural double acting air cylinders 46 for actuating an accel pedal 42, a brake pedal 43, a clutch pedal 44 and a shift lever 45 in accordance with each command stroke; an actuator controller composed of an electromagnetic unit 48, a plurality of electromagnetic valve actuating circuits 49, and a plurality of 8-bit one-chip microcomputer (i.e. microprocessor $\mu p$) 50; and a main controller composed of a general purpose 16-bit personal computer 55.

Various test conditions such as engine speed $N_e$, a vehicle speed V, current air cylinder positions of the air cylinders 46 (each detected by a potentiometer 47), etc. are inputted to the personal computer 55 through a keyboard as external commands. Further, as shown in FIG. 1(b), it is possible to select operations of "TEACHING (automatic measurement)", "AUTO TRAVEL", "MANUAL TRAVEL", and "END" through the keyboard. A CPU within the personal computer 55 executes each selected operation.

The TEACHING operation can be classified into two teaching operations of transmission gear change position teaching and pedal position teaching. In the transmission gear change position teaching, whenever the operator manually operates the transmission shift lever 45 for shift gear change, each shift gear position is stored in a memory unit within the computer 55 as teaching data. In the pedal position teaching, whenever the three pedals 42 to 44 are depressed automatically on the basis of a program, a play (free travel) of the accel pedal 42, an effective position of the brake pedal 43, an engage position of the clutch pedal 44, etc. are stored as teaching data.

When "AUTO TRAVEL" is selected, an actual vehicle speed detected by the dynamometer is compared with a command vehicle speed stored in the memory, and either of the accel pedal 42 and the brake pedal 43 is depressed to match the actual vehicle speed with the command vehicle speed by operating each air cylinder 46 at an appropriate timing. The command position $L_s$ and the current position $L_i$ of each air cylinder 46 is transmitted to each microcomputer 50, respectively, to calculate a difference $\Delta L$ between the command position $L_s$ and the current position $L_i$ and determines a valve open duration according to the difference $\Delta L$ with reference to table data, so that the current position $L_i$ coincides with the command position $L_s$ in each air cylinder 46. In this operation, the air cylinder 46 is driven by actuating two electromagnetic valves A and Aa or B and Ba, respectively as shown in FIG. 1(c), on the basis of a positive or negative sign attached to the calculated position difference.

For instance, in FIG. 1(c), when the accel pedal 42 is required to be depressed to shift the current position $L_i$ to be command position $L_s$ of the piston 46A of the air cylinder 46, two electromagnetic valves A and Aa are selected and opened for a time period according to the calculated position difference with the valves B and Ba kept closed.

Further, each electromagnetic valve A, Aa, B or Ba is composed of two parallel arranged electromagnetic valves connected between a pressurized air inlet port 58A into which pressurized air of 5 kgf/cm$^2$ is introduced and an outlet port 58B exposed to atmospheric pressure, a shown in FIG. 1(d). The reason why two cylinders are arranged in parallel is that the piston can be moved at higher speed when the number of the electromagnetic valves increases. For the same reason as described above, three parallel-arranged electromagnetic valves are connected in parallel to the air cylinder for the clutch pedal in order to further increase the gear shift time.

In FIG. 1(d), when the valves A and Aa are opened, since pressurized air (5 kgf/cm$^2$) is introduced into the right chamber 46B via the valves A and further air is exposed from the left chamber 46C to the atmosphere via the valves Aa, the piston 46A moves leftward to the command position $L_s$. On the basis of the movement of the piston 46A, the accel pedal 42 is further depressed via a wire 56 and a link mechanism 57 both shown in FIG. 1(c).

As described above, each pedal 42 to 44 and the shift lever 45 are actuated automatically in accordance with the position control of the air cylinders 46.

In the prior-art automatic vehicle driving system as described above, however, since the actual vehicle speed is compared with the command vehicle speed and the positions of the air cylinders 46 are controlled so that the actual vehicle speed becomes equal to the command vehicle speed, it is necessary to determine optimum control gains for each test vehicle. Here, the control gain implies a constant required to convert a difference between the actual vehicle speed and the command vehicle speed into each air cylinder movement stroke.

Therefore, whenever the test vehicle changes, since the optimum control gain (conversion constant) also changes, there exists a problem in that the control gain must be set according to each test vehicle. The above-mentioned problem also arises whenever the load conditions of the chassis dynamometer change. In other words, since the optimum control gains are different according to command vehicle speed data stored in the memory so as to be suitable for each test vehicle, there exists a problem in that the control gain setting work is troublesome and therefore it takes much time to adjust the control gains.

SUMMARY OF THE INVENTION

With these problems is mind, therefore, it is the primary object of the present invention to provide an automatic vehicle driving system and a method of driving the same which can reduce the adjusting time required to set optimum control gains for each test vehicle, while minimizing the braking operation.

To achieve the above-mentioned object, the first aspect of the automatic vehicle driving system according to the present invention comprises: (a) means (5) for sensing engine speed; (b) means (3) for sensing vehicle speed; (c) means (4) for calculating vehicle change speed on the basis of sensed vehicle speed; (d) means (2) for actuating an accel pedal; (e) means (6) for forming a table indicative of relationship between accel actuator stroke and engine output torque on the basis of the sensed engine speed, the sensed vehicle speed, and the calculated vehicle change speed; (f) means (7) for storing the formed stroke-torque table; (g) means (8) for storing command vehicle speed data; (h) means (9) for calculating command vehicle change speed; (i) means (10) for calculating necessary power to drive a vehicle at the command vehicle speed and the command vehicle change speed; (j) means (11) for discriminating whether the vehicle must be accelerated or kept at steady speed on the basis of the calculated necessary power; (k) means (12) for converting the calculated necessary power into an engine output torque according to the sensed engine speed when the vehicle must be accelerated or keep at steady speed; (1) means (13) for calculating ah accel actuator stroke required to generate the converted engine output torque with reference to the stroke-torque table formed by said stroke-torque forming means; and (m) means (14) for commanding the calculated stroke to said accel actuating means.

Further, the second aspect of the system according to the present invention further comprises: (a) means (22) for actuating a brake pedal; (b) means (23) for forming a table indicative of relationship between engine friction loss power and engine speed on the basis of the sensed engine speed, the sensed vehicle speed, and the calculated vehicle change speed; (c) means (24) for storing the formed friction loss power-engine speed table; (d) means (25) for calculating a friction power loss according to the current engine speed with reference to the formed friction loss power-engine speed table; (e) means (26) for discriminating whether the vehicle speed must be decelerated on the basis of the calculated necessary power; (f) means (27) for calculating an addition of the calculated necessary power to the calculated friction loss power when the vehicle must be decelerated; (g) means (28) for discriminating whether the vehicle speed can be decelerated by only engine brake or not on the basis of the added power; (h) means (29) for calculating an accel actuator stroke when the vehicle speed can be decelerated by only engine brake; (i) means (30) for calculating a brake actuator stroke when the vehicle speed cannot be decelerated by only engine brake; and (j) means (31) for commanding the calculated stroke to said brake actuating means.

Further, the method of driving a vehicle according to the present invention comprises the steps of: (a) reading actual engine speed and actual vehicle speed; (b) reading a stored command vehicle speed and calculating a change speed on the basis of the command vehicle speed; (c) calculating a necessary power PS with reference to a stored vehicle speed-steady travel power table; (d) calculating an engine friction loss power F with reference to a stored friction loss power-engine speed table; (e) calculating an addition PS+F of the calculated necessary power and the calculated friction power; (f) checking whether the calculated addition is equal to or more than zero $PS+F \geq 0$; (g) if equal to or more than zero, determining that vehicle speed can be decelerated by only engine brake; (h) checking whether the calculated necessary power is equal to or more than zero $PS \geq 0$; (i) if equal to or more than zero, determining that vehicle speed must be accelerated or kept at steady speed; (j) converting the necessary power PS into an engine output torque T according to the current engine speed; (k) calculating an accel actuator stroke with reference to a stored stroke-torque table; and (l) outputting a calculated command stroke to an accel actuator. Further, the method comprises the step of: (a) if the calculated addition is less than zero as $FS+F<0$ in step (f) above, determining that vehicle speed must be decelerated by both engine brake and brake pedal; and (b) commanding a calculated stroke to an brake actuator. Further, the method comprises the steps of: (a) if the calculated necessary power is less than zero $PS<0$ in step (f) above, determining that vehicle speed must be decelerated and calculating an accel actuator stroke $S_N$ according to no-load engine speed with reference to a stored engine speed-actuator stroke table in accordance with interpolation method; (b) calculating a command accel actuator stroke $S_x$ on the basis of the calculated stroke $S_N$ in accordance with linear approximation interpolation method; and (c) correcting the calculated command stroke $S_x$ on the basis of a difference between actual vehicle speed and command vehicle speed, before outputting the calculated command stroke to the accel actuator.

In the automatic vehicle driving system according to the present invention, a table indication of the relationship between the accel actuator stroke and the engine output torque and a table indication of the relationship between the engine friction loss power and the engine speed are formed and stored in the memory unit of a computer by teaching operation before the vehicle is driven automatically. Further, during the automatic vehicle travelling, the command accel actuator stroke is determined with reference to the formed stroke-torque table when the vehicle speed is accelerated or kept at steady travel, thus markedly reducing the setting time of the driving system. Additionally, when the vehicle speed is decelerated, the necessity of brake pedal depression is determined with reference to the friction loss power-engine speed table to eliminate unnecessary braking operation.

In other words, since the engine output torque is determined in open-loop control with reference to the stored tables (not a feedback control on the basis of actual vehicle speed), it is possible to eliminate control gain adjusting or setting work for each test vehicle or for each load applied onto the test vehicle.

In the first aspect of the present invention, before a test vehicle is automatically driven on a chassis dynamometer, a numeric table indicative of the relationship between the engine output torque and the accel actuator stroke is stored by teaching operation of the computer on the basis of vehicle speed, change speed (acceleration, steady travel), and engine speed, for each test vehicle. After the test vehicle is driven automatically in accordance with the command vehicle speed data, a power PS required to drive the vehicle at the designated vehicle speed and acceleration is calculated on the basis of the command vehicle speed data, and it is discriminated whether the vehicle speed must be accelerated or kept at steady speed on the basis of the calculated power PS.

When the vehicle speed is accelerated or kept at a steady speed, the required power is converted into an engine output torque according to the current engine speed, and an accel actuator stroke at which the converted torque T can be generated is calculated on the basis of the stored stroke-torque table. The calculated stroke is commanded to the actual actuator to depress the accel pedal, so that an engine torque required for acceleration or steady travel can be obtained.

In the second aspect of the present invention, a numeric table indicative of the relationship between the engine friction loss power and the engine speed is stored by teaching operation on the basis of vehicle speed, change speed, and engine speed for each test vehicle. Further, a friction loss is calculated according to the current vehicle engine speed with reference to the stored friction loss-engine speed table. When the vehicle speed is decelerated, it is discriminated whether the vehicle speed can be decelerated by only engine brake or by both engine brake and brake pedal depression on the basis of power calculated with reference to the friction loss-engine speed table. When the vehicle speed can be decelerated by only engine brake, the accel pedal is released. When cannot be decelerated by only engine brake, the brake pedal is further depressed in addition to the engine brake.

BRIEF DESCRIPTION OF THE DRAWINGS

FIG. 4 is a graphical representation showing an example of the relationship between vehicle speed and mechanical dynamometer loss power;

DETAILED DESCRIPTION OF THE PREFERRED EMBODIMENTS

Embodiments of the automatic vehicle driving system and the method therefor according to the present invention will be described hereinbelow with reference to the attached drawings.

Figure 1:
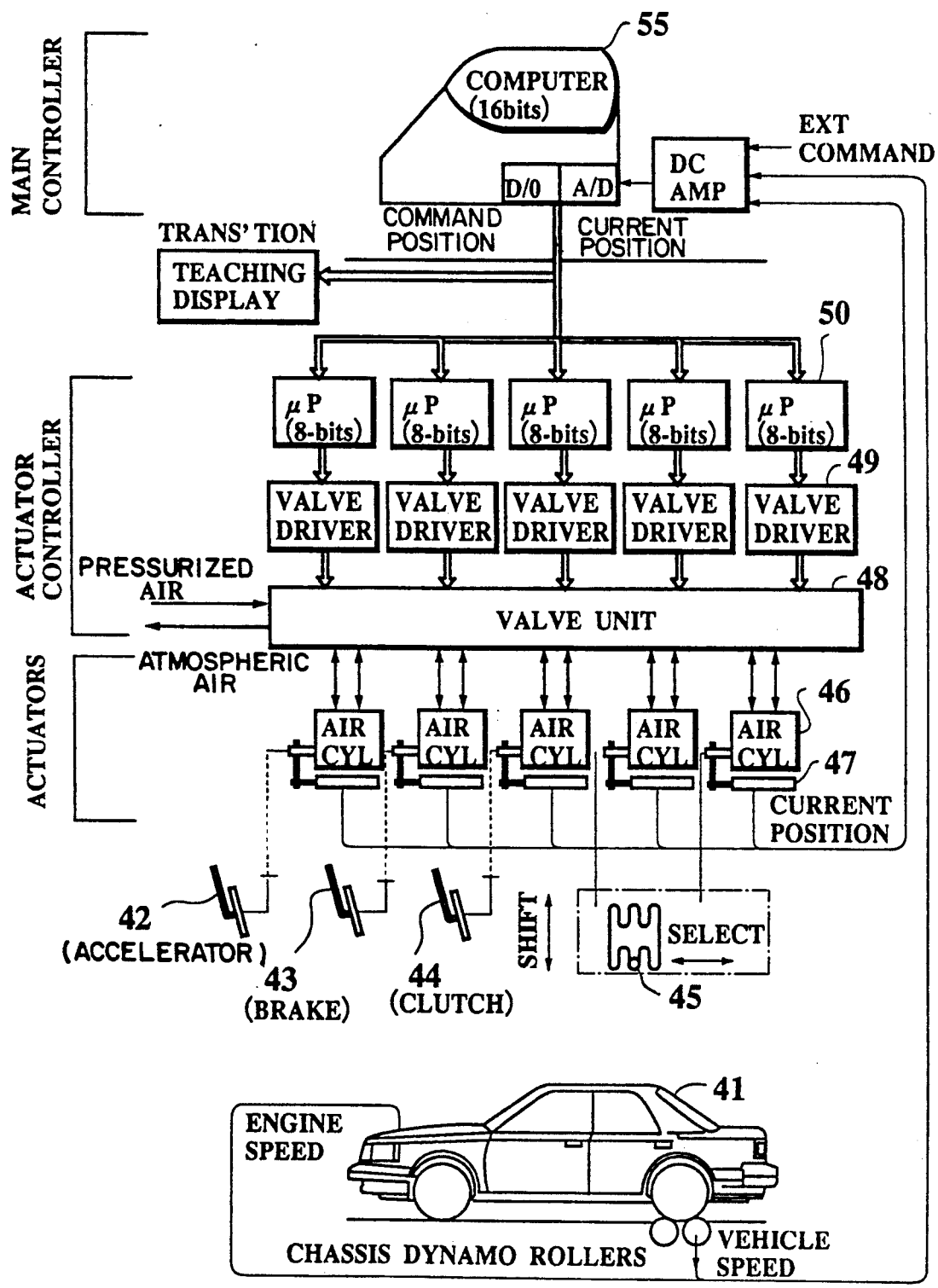
FIG. 1(a) is a schematic block diagram showing an entire system configuration of a prior-art automatic vehicle driving system.
FIG. 1(b) is a flowchart for assistance in explaining the main controller operation of the prior-art system shown in FIG. 1(a)
FIG. 1(c) is a diagrammatical view for assistance in explaining the position control of the air cylinder of the prior-art system shown in FIG. 1(a)
FIG. 1(d) is an enlarged piping diagram of the electromagnetic valve arrangement of the prior-art system.
Figure 1:
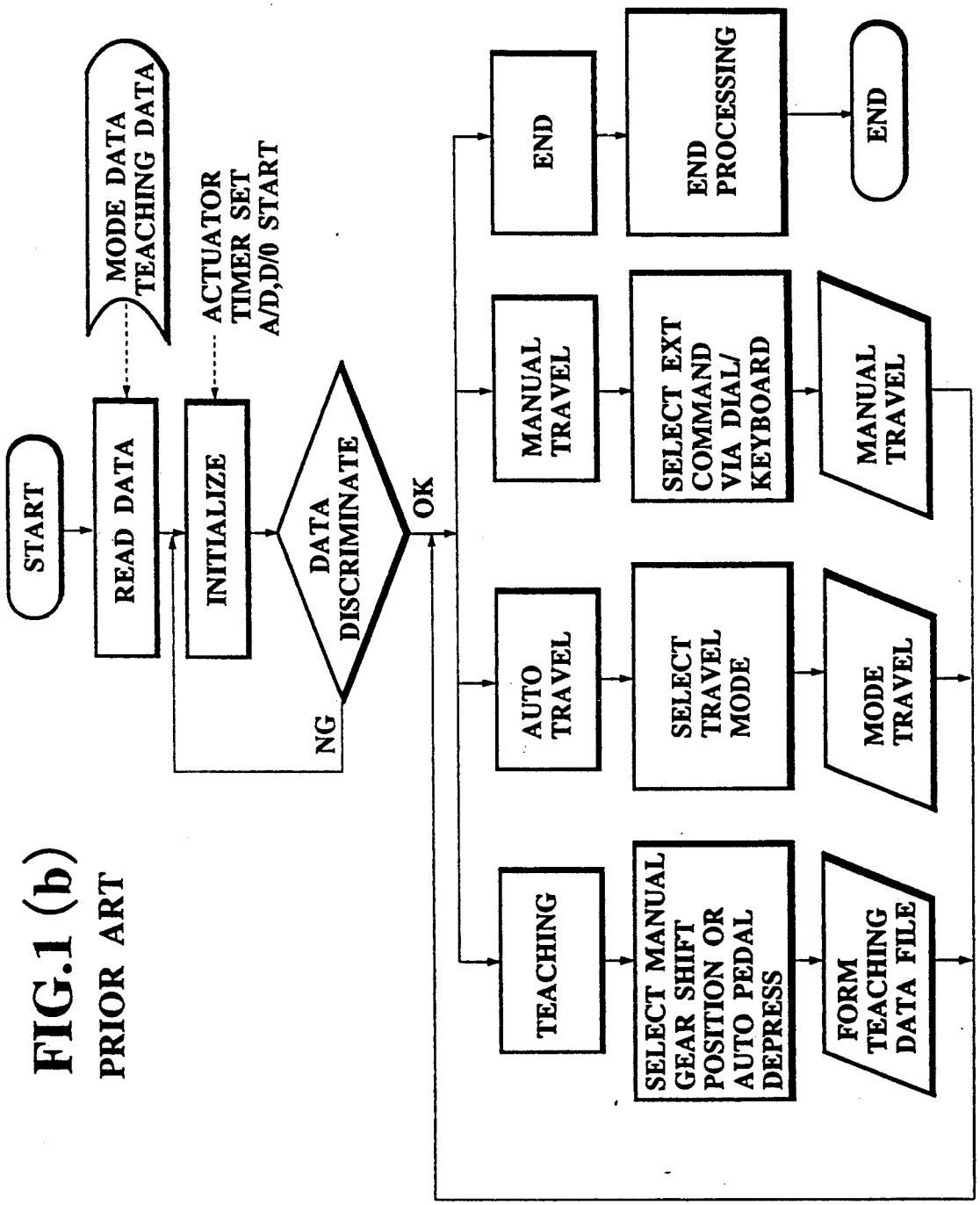

The entire system configuration of the present invention is roughly the same as that of the prior-art system as shown in FIG. 1(a), except some operations executed by the personal computer 55 as described later in detail.

With reference to FIG. 1(a), engine rotational speed $N_e$ and actual vehicle speed V are inputted to the personal computer 55. The engine speed $N_e$ can be obtained on the basis of an ignition signal pulse or a dc voltage converted from the ignition pulse frequency. The actual vehicle speed V can be obtained from a tachometer output signal or a pulse generator output signal. Further, command vehicle speed data are previously stored in a memory unit of the personal computer 55. These data are tables representative of the relationship between command vehicle speed and time elapsed (acceleration rate) at each of ten modes, for instance.

The differences between the prior-art system and the invention system in operation executed by the personal computer 55 are the following three points, in which the first and second points (1) and (2) are executed before the automatic travel test and the third point (3) is executed during the automatic travel test as follows:

(1) Table formation by power performance teaching operation

Figure 2:
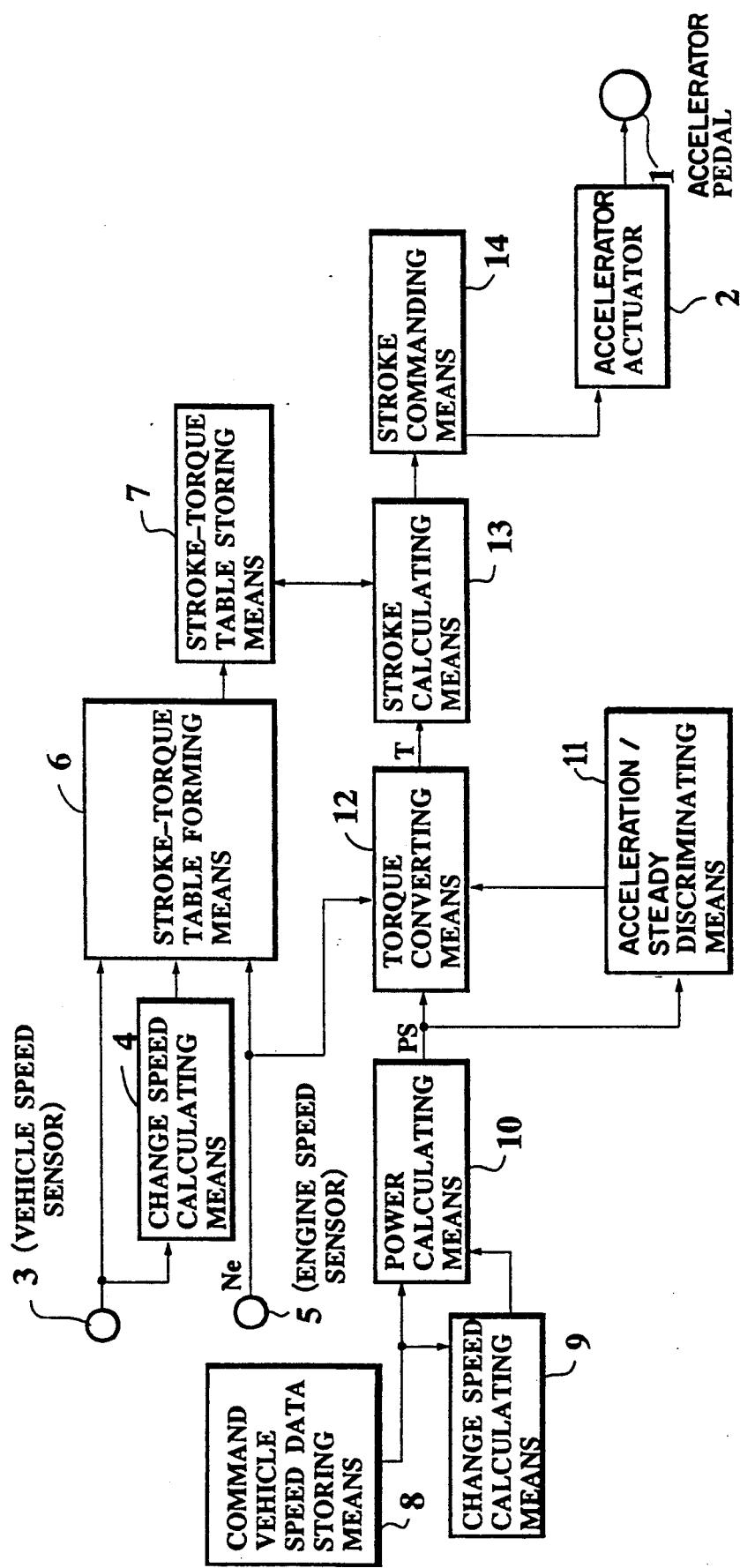
FIG. 2(a) is a schematic block diagram showing a first aspect of the automatic vehicle driving system according to the present invention.
FIG. 2(b) is a schematic block diagram showing a second aspect of the automatic vehicle driving system according to the present invention.
Figure 2:
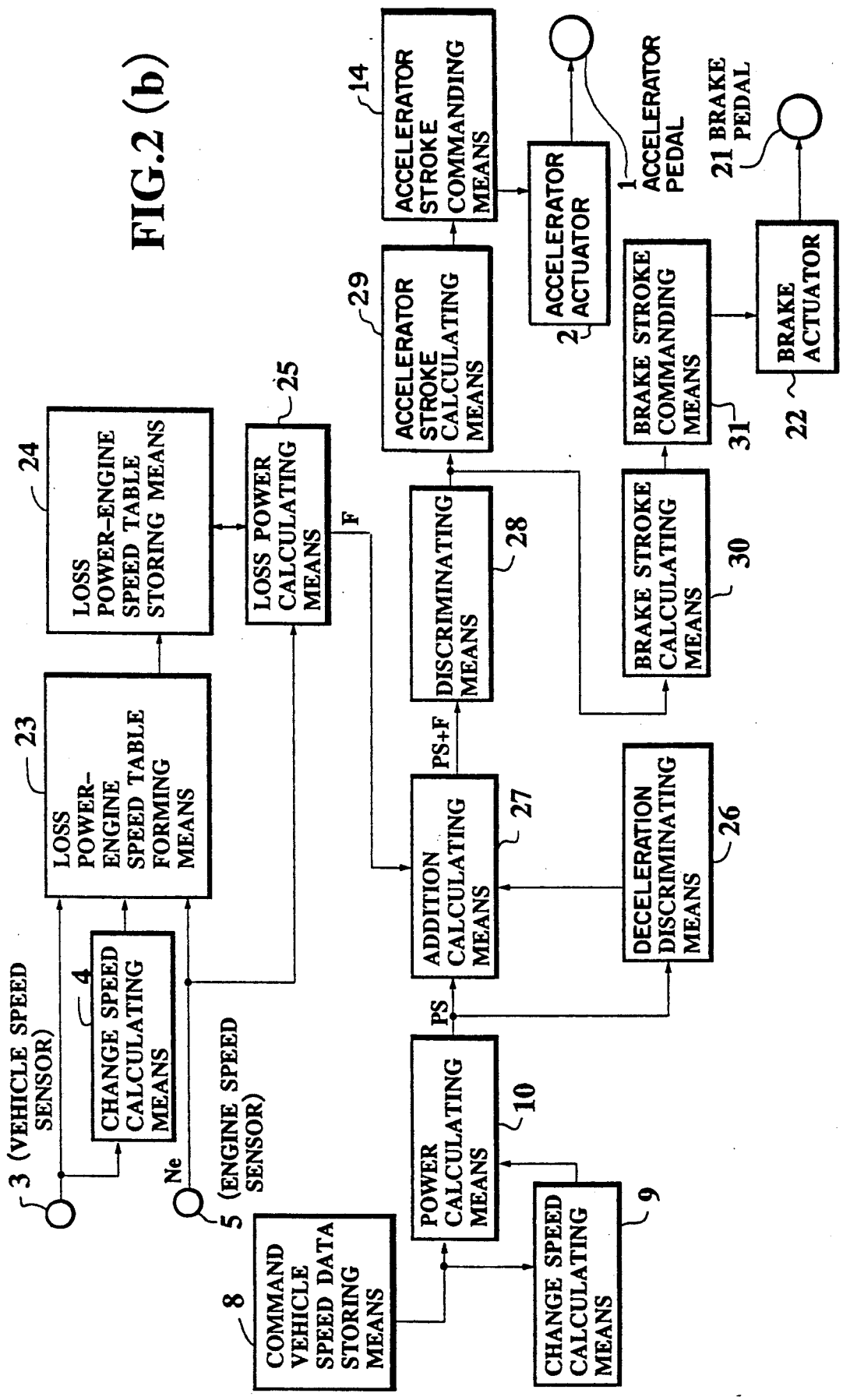
Figure 5:
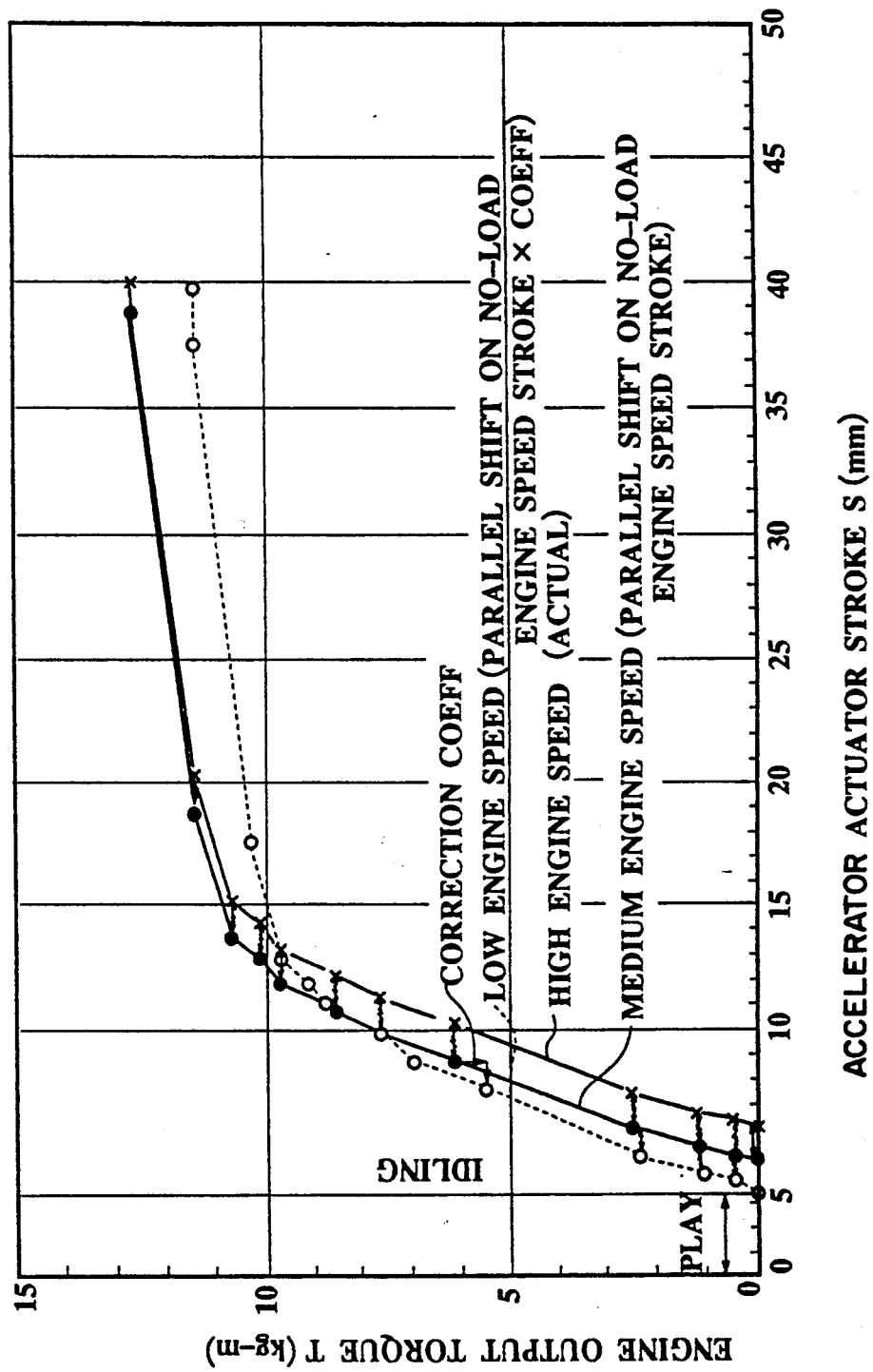
FIGS. 5(a) and (b) are graphical representations showing two (manual and automatic transmissions) exemplary characteristics between accel actuator stroke and engine output torque with engine speed as parameter, which are stored as reference tables.

This operation corresponds to accel stroke-engine torque table forming means 6 shown in FIG. 2(a) for forming tables as shown in FIG. 5(a) and 5(b), which can be executed in accordance with a predetermined program.

That is, change in vehicle speed according to stroke of the accel actuator (accel pedal aircylinder) is measured by driving the engine at steady speed so that vehicle speed or engine speed is kept at a low, medium or high speed, or at acceleration state so that vehicle speed or engine speed is accelerated by increasing the accel air cylinder stroke. Further, engine output torque T is calculated on the basis of the vehicle speed and the vehicle change speed (acceleration or deceleration).

Figure 3:
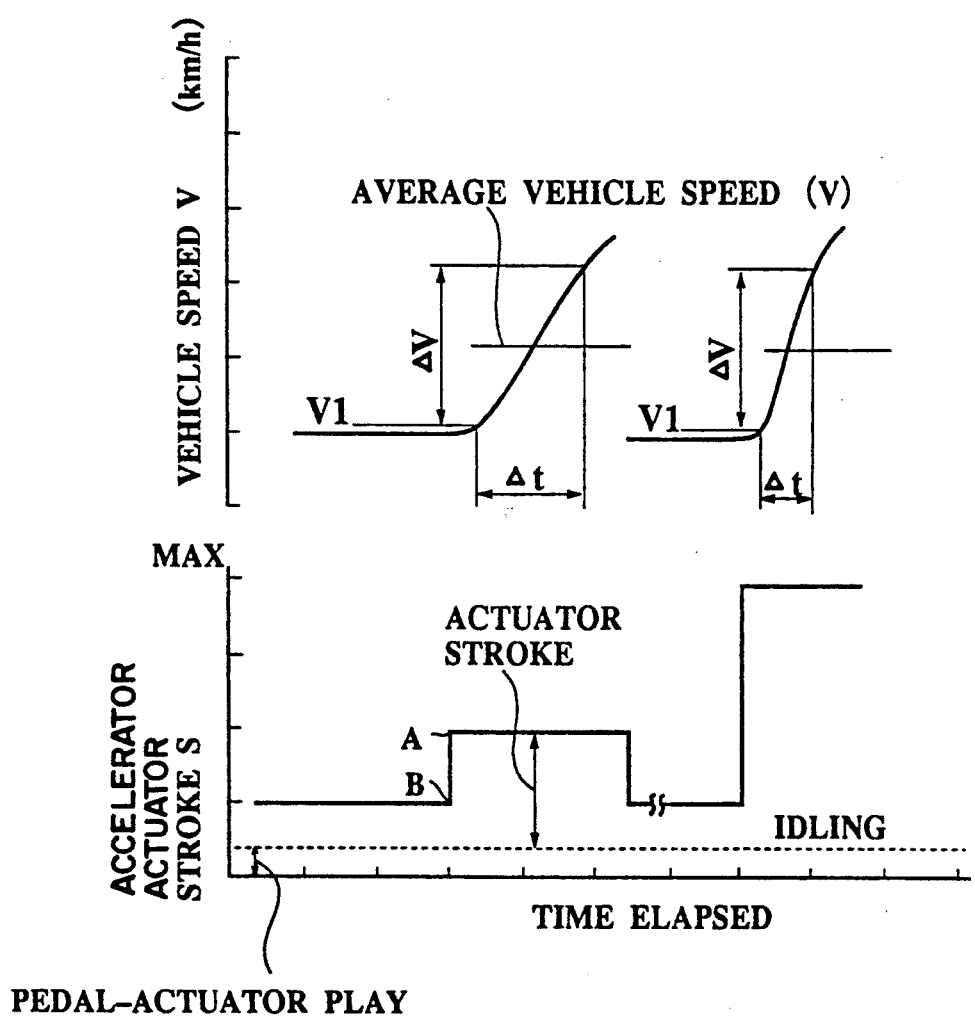
FIGS. 3(a) and (b) are graphical representations showing two (acceleration and deceleration) examples of the relationship between accel actuator stroke and vehicle speed, in which the abscissa indicates the time elapsed.
Figure 3:
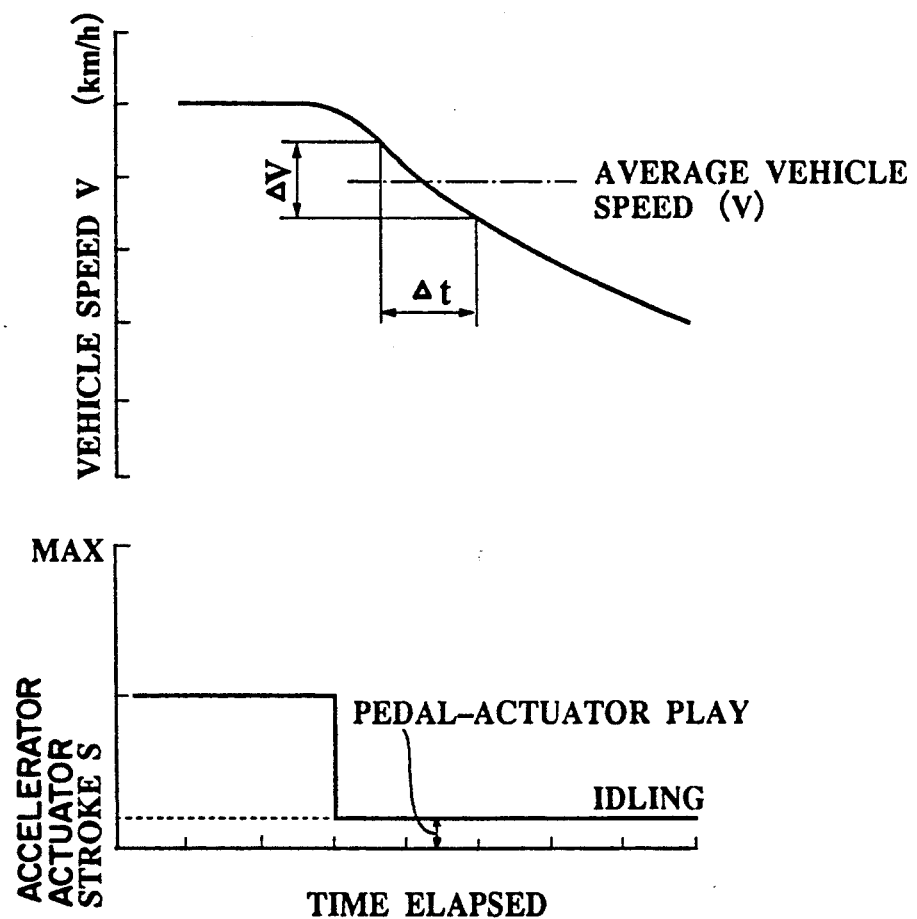

For instance, as shown in FIG. 3(a) when the accel actuator stroke is increased from point B to A by a predetermined stroke in response to a command from the personal computer 55, the vehicle speed changes from $V_1$ by $\Delta V$ with a certain time delay $\Delta t$.

Under such conditions as described above, the output horsepower PS can be calculated in accordance with the following formula:

$$PS = K_1 \mu_r WV + K_2 \mu_c \{\rho/(2g \times 3.6^2)\} AV^3 + \quad (1)$$

-continued $$K_3 \{(W + W_e)/g\} V_\alpha$$

where
PS: necessary horsepower (Ps)
$K_1, K_2, K_3$: constants
$\mu_r$: tire rolling resistance coefficient
W: vehicle weight (kgf)
V: vehicle speed (km/h)
$\mu_c$: air resistance coefficient
A: vehicle front projection area (m$^2$)
$\rho$: air density (kg/m$^3$)
g: gravity acceleration (m/s$^2$)
$W_e$: inertia-equivalent weight (kgf) of rotating parts
$\alpha$: acceleration Further, values other than vehicle speed and acceleration $\alpha$ (=$\Delta V/\Delta t$) are inputted to the personal computer 55 and stored in the memory thereof whenever each vehicle is tested.

The above formula (1) indicates a horsepower required when the vehicle travels at a vehicle speed V and an acceleration $\alpha$, in which the first term is referred to as rolling resistance horsepower; the second term is referred to as windage loss horsepower; and the third term is referred to as acceleration resistance horsepower.

On the other hand, where a vehicle is travelling on a chassis dynamometer, the sum of the rolling resistance horsepower and the windage loss horsepower is referred to as steady travel horsepower, which is equal to a mechanical dynamometer loss horsepower including vehicle mechanical loss. Therefore, it may be more practical to previously measure the dynamometer loss horsepower according to vehicle speed, when the chassis dynamometer is used, without use of the formula (1).

To measure the dynamometer loss horsepower, the deceleration rate is first measured by driving the vehicle on the chassis dynamometer at a predetermined vehicle speed, shifting transmission gear to Neutral position, and then reducing the command stroke of the accel actuator by a predetermined value as depicted in FIG. 3(b). The dynamometer loss horsepower can be obtained by substituting the obtained deceleration rate and the vehicle speed into the formula (1) in which $W_e=0$ at the third term. Since the dynamometer loss horsepower thus obtained includes loss horsepower such as mechanical loss or tire loss, this horsepower is the steady travel loss power which increases with increasing vehicle speed as shown in FIG. 4.

Further, in case the chassis dynamometer power loss characteristics are not expressed in accordance with the formula (1), the necessary horsepower PS can be obtained by calculating the steady travel horsepower by interpolation with reference to a table containing the characteristics as shown in FIG. 4 and by adding this interpolated steady travel loss horsepower to the acceleration loss horsepower calculated at the third term of the formula (1).

The necessary horsepower PS (Ps) thus obtained at steady speed or at acceleration state is transformed into engine output torque (kgf) on the basis of engine speed $N_e$ (rpm) as follows:

$$T = (716.2/N_e)PS \quad (2)$$

The relationship between the engine output torque T and the accel actuator stroke required to generate the torque are stored as tables as shown in FIG. 5(a), in which the accel stroke and engine torque characteristics are shown with engine speed (low, medium and high) as parameter, because the characteristics change according to engine speed at the same accel actuator stroke. However, when the vehicle speed does not change markedly according to change in engine speed, only a single table corresponding to an average engine speed may be sufficient.

Figure 6:
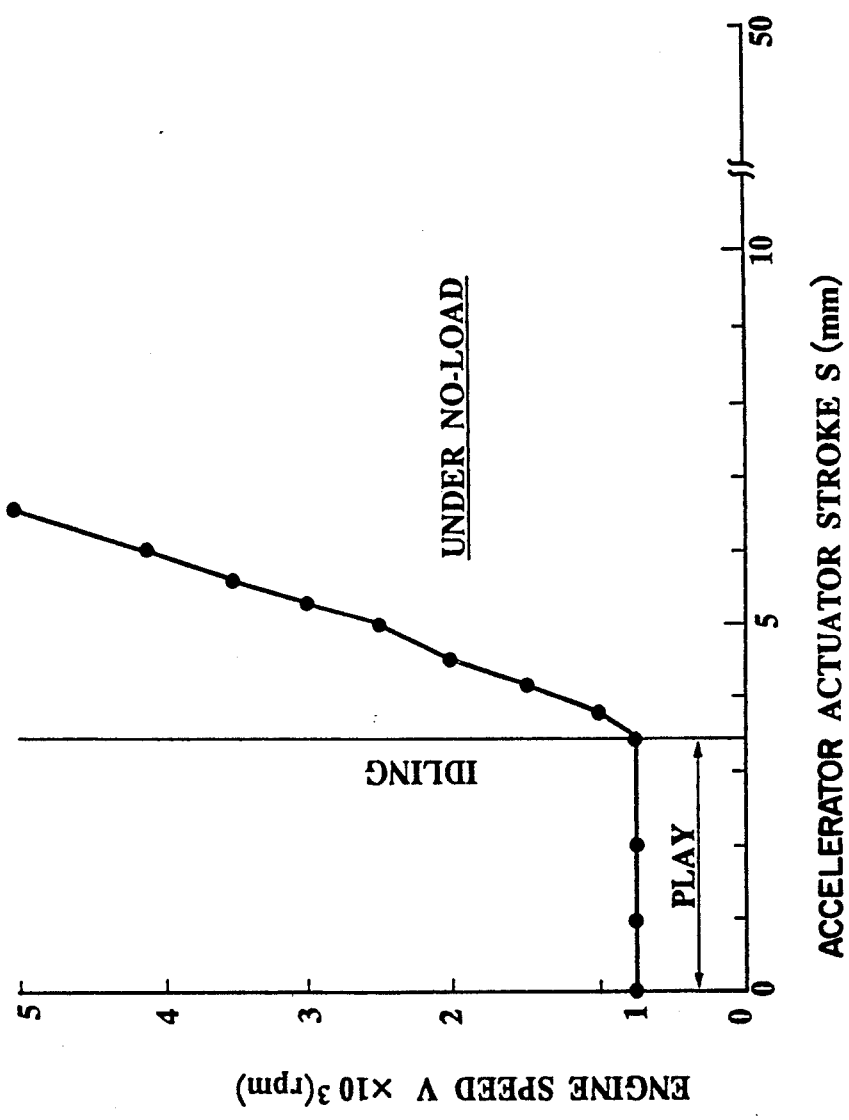
FIG. 6 is a graphical representation showing characteristics between accel actuator stroke and engine speed under no load, which are stored as a reference table.

Further, where the engine is not connected to a driving shaft via a rigid body as in an automatic transmission vehicle, since kickdown (shifted from a high range to a low range in an automatic transmission) is generated, there exist some cases where the engine output torque cannot be measured with engine speed as parameter. In this case, the stroke-torque characteristics are first obtained at a mensurable engine speed (high engine speed, in general), and then obtained characteristics for high speed are shifted or corrected to the stroke-torque characteristics suitable for low and medium engine speed by parallel shifting the high speed characteristics on the basis of the relationship between accel actuator stroke and engine speed obtained under no-load conditions as shown in FIG. 6. FIG. 5(b) shows an example of the stroke-torque characteristics for an automatic trans-mission vehicle, thus obtained.

The above-mentioned engine speed-stroke characteristics under no-load conditions can be obtained by reading engine speed when the accel actuator stroke is increased gradually under no engine load condition. The obtained characteristics as shown in FIG. 6 are also stored as a table in the computer 55.

(2) Table formation by friction loss power teaching operation

This operation corresponds to loss power-engine speed table forming means 23 shown in FIG. 2(b), which can be executed in accordance with a predetermined program as follow:

That is, deceleration horsepower $PS_\alpha$ (Ps) can be calculated in accordance with the formula (1) in which $W_e=0$ in the third term and on the basis of deceleration rate and the vehicle speed obtained when the accel actuator is returned from a predetermined vehicle speed position to an idling position and then the engine is kept running at a predetermined gear shift position. Since a steady travel loss horsepower $PS_{R/L}$ (Ps) (the sum of the first and second terms in the formula (1) is included in this deceleration horse-power $PS_\alpha$, engine friction loss horsepower F (Ps) can be obtained by subtracting the steady travel loss power from the deceleration horsepower $PS_\alpha$ as $$F = PS_\alpha - PS_{R/L} \quad (3)$$

Figure 7:
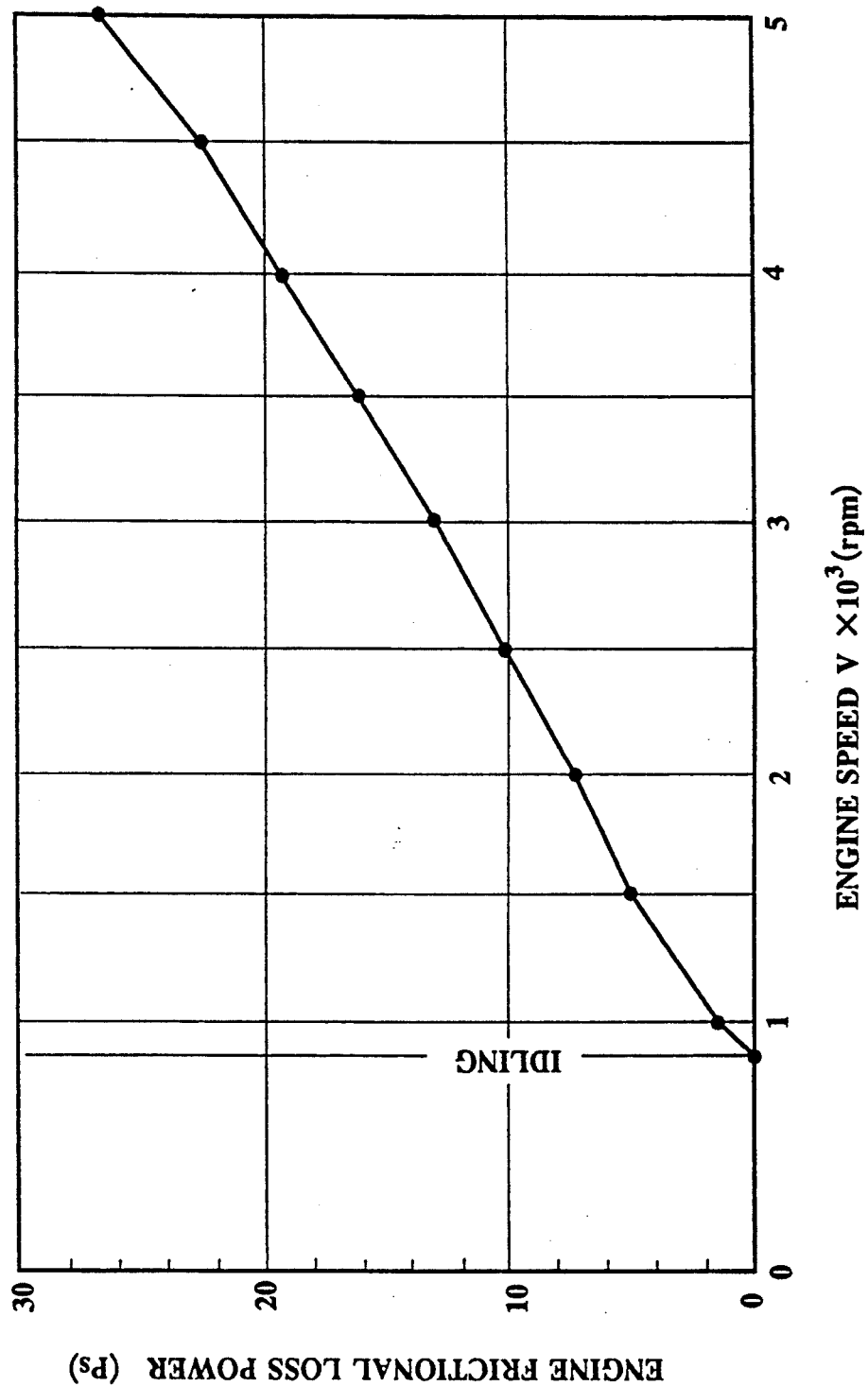
FIG. 7 is a graphical representation showing characteristics between engine speed and engine frictional loss power, which are stored as a reference table.

The relationship between friction loss horsepower F and engine speed $N_e$ is stored as a table as shown in FIG. 7, in which the deceleration horsepower $PS_\alpha$ is calculated as values having a positive sign (+). Further, in FIG. 7, when the engine speed drops down to an idling speed, the engine friction loss horsepower is minimized. This engine friction loss horsepower can be considered as the idling travel loss horsepower having a sign opposite to the engine friction loss power an opposite signee. Further, when the friction loss power F is calculated from the formula (3), the second term of this formula (3) can be read from the characteristics shown in FIG. 4.

(3) Stroke commanding method with reference to tables obtained by teaching operation In various travel modes (e.g. 10 or 11 modes), the relationship between command vehicle speed and time elapsed is determined as numerical values. The test vehicle is driven on the chassis dynamometer in accordance with the numerical values determined in a selected mode.

In this embodiment, therefore, a horsepower PS necessary to drive the vehicle at any given command vehicle speed and change speed (acceleration or deceleration) is calculated in accordance with the formula (1). An engine output torque T is calculated according to engine speed $N_e$ on the basis of the obtained horsepower PS in accordance with the formula (2). On the basis of the calculated engine output torque T, the accel actuator strokes can be obtained with reference to the stroke-torque table as shown in FIG. 5(a) or 5(b) (already stored in the personal computer 55 by teaching operation) by interpolation calculation for each of the already taught three engine speeds, in order to basically command the obtained stroke to the accel actuator.

The travel modes are three modes of acceleration, steady and deceleration travels. Here, in the case of the acceleration and steady travel modes, the command stroke is given to the accel actuator as described above. When a stroke command is given, no large error is produced at the accel actuator stroke actuated in response to the command stroke, as far as load on the chassis dynamometer does not change markedly. If any, only a small error is produced due to the interpolation calculation in the table for each of three engine speeds.

In contrast, in the case of deceleration mode, the operation is different from the cases of the acceleration and steady travel modes. This is because in the deceleration mode, there exist two cases where engine speed is decelerated by only releasing the accel pedal (by only engine brake) and by additionally depressing a brake pedal. Therefore, it is necessary to discriminate whether the brake pedal must be depressed or not.

In more detail, since the horsepower PS necessary to decelerate the engine is a negative value and further the friction loss horsepower F serves as an engine brake during deceleration travel, when a value obtained by adding the friction loss horsepower F (calculated as a positive value) to the necessary horsepower PS is zero or more (a positive value or F is larger than PS) this indicates that the engine can be decelerated down to a command vehicle speed by only engine brake. In contrast, when the above value is less than zero (a negative value), (F is smaller than PS) since it is impossible to decelerate the engine by only releasing the brake pedal (engine brake), it is necessary to further depress the brake pedal. Therefore, in order to check whether the engine can be decelerated by only releasing the accel pedal or not, it is necessary to form a table of the relationship between engine speed and engine friction loss horsepower F as shown in FIG. 7 by the teaching operation as already explained.

In addition, since the engine output torque is negative within a range where the engine can be decelerated by only engine brake, it is rather difficult and complicated to obtain negative torque by teaching operation. Therefore, the command stroke of the accel actuator within the above range is determined in accordance with the following method:

First, a friction loss horsepower (Ps) of the current engine speed $N_e$ is obtained by interpolation calculation on the basis of the table as shown in FIG. 7, and the no-load accel actuator stroke $S_N$ (mm) at the current engine speed $N_e$ is obtained by interpolation calculation on the basis of the table as shown in FIG. 6.

Now, when the necessary power PS (Ps) calculated on the basis of a deceleration rate relative to the command vehicle speed is a negative value and further the absolute value $|PS|$, is less than the friction loss horsepower F, it is necessary to return the accel pedal by a horsepower corresponding to a difference $F - |PS|$. Therefore, if PS=0 (no power), the actuator stroke to be returned becomes a maximum value $S_N$.

On the other hand, if $F = |PS|$, since this indicates an idling state (but a play between the accel pedal and the accel actuator is excluded) or a balance state (where the necessary horsepower PS is equal to the friction loss horsepower F), the actuator stroke to be returned becomes a minimum value.

Figure 8:
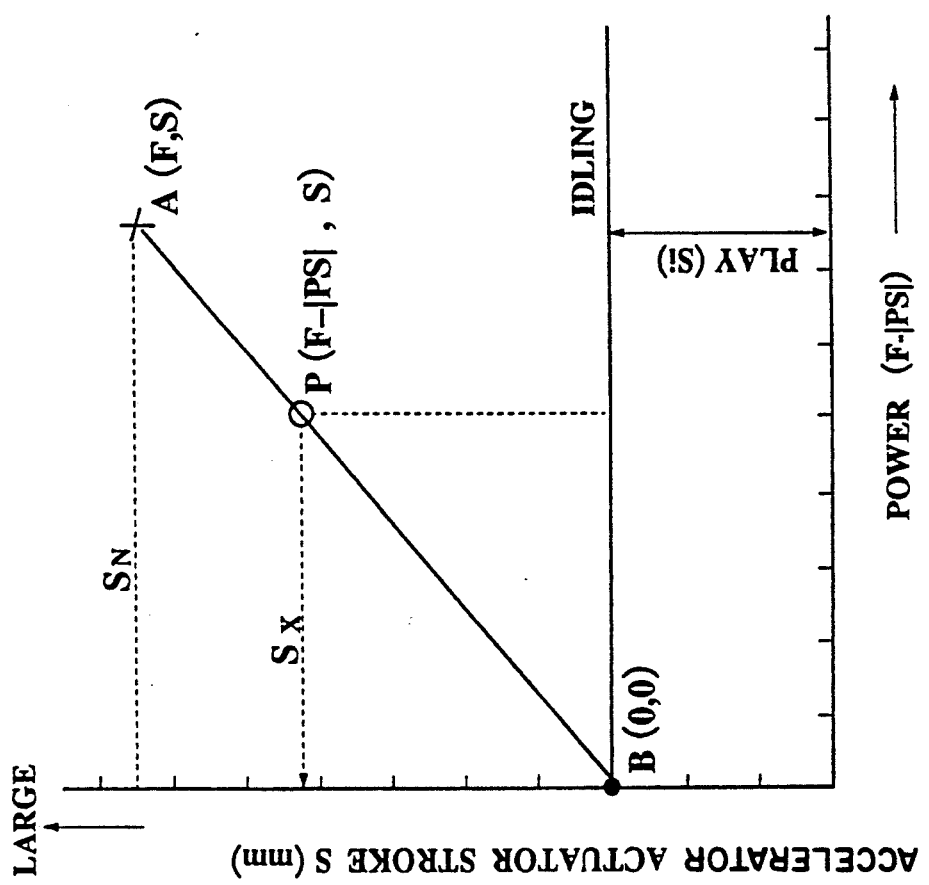
FIG. 8 is a graphical representation for assistance in explaining the method of obtaining accel actuator stroke by interpolation calculation when engine speed is decelerated.

Therefore, it is possible to calculate the accel actuator stroke $S_x$ (mm) to be returned in accordance with interpolation calculation by linearly approximating the stroke $S_x$ between the maximum and the minimum values as shown in FIG. 8 in accordance with the following formula:

$$S_x = S_N (F - |PS|)/F \qquad (4)$$

In FIG. 8, point A indicates the maximum stroke and point B indicates the minimum stroke. Further, since the play $S_i$ between the accel pedal and the accel actuator changes whenever the accel actuator is connected to the accel pedal, this play $S_i$ is initially subtracted from the accel actuator stroke S during calculation and added to the calculated stroke when the actual stroke is actually commanded to the accel actuator. This play $S_i$ corresponds to a stroke obtained just before the engine speed increases when the accel actuator stroke is gradually increased from the engine idling state (by teaching). The obtained play $S_i$ is also stored in the personal computer 55.

Figure 9:
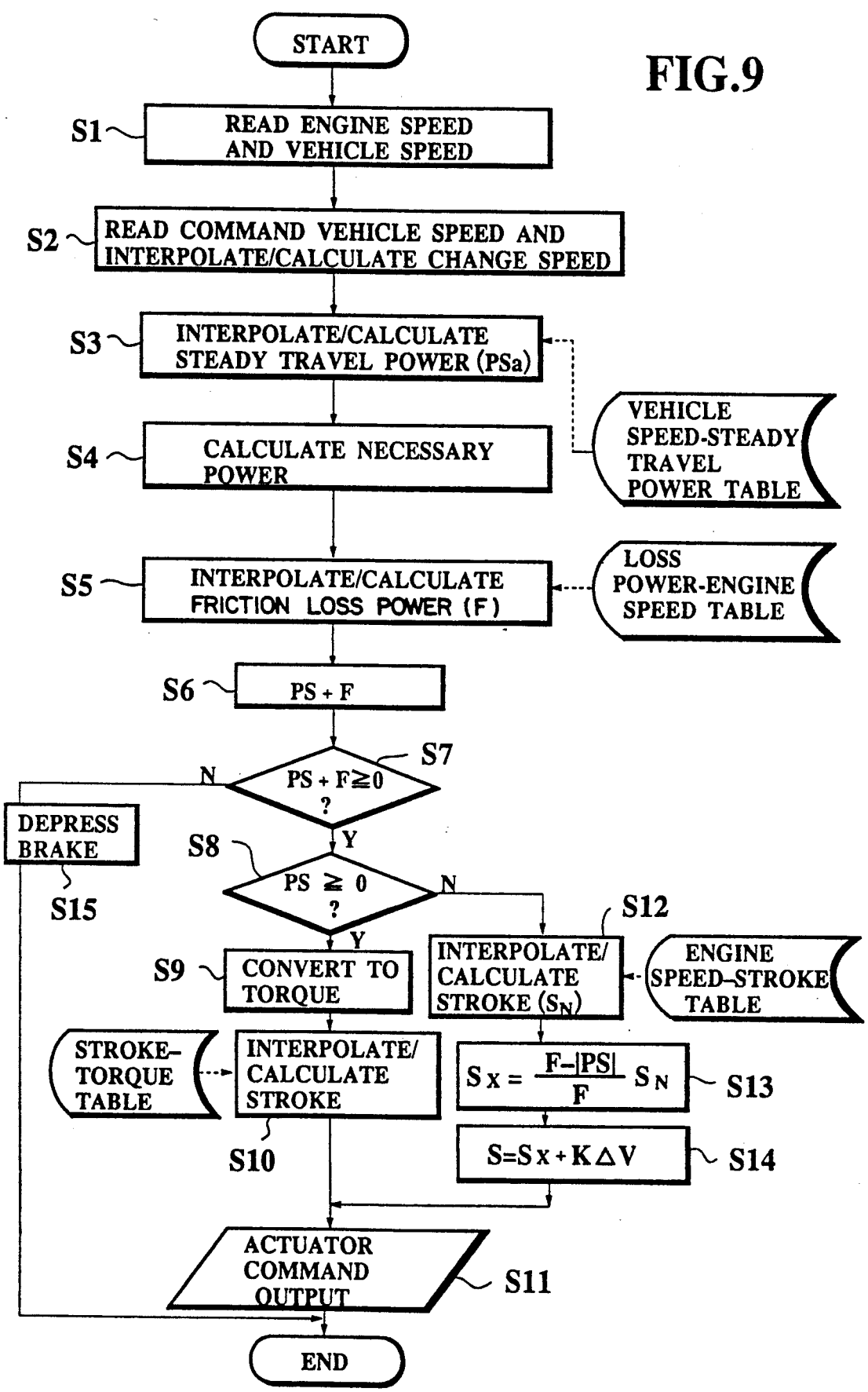
FIG. 9 is a flowchart for assistance in explaining the control operation of the system according to the present invention.

FIG. 9 shows a flowchart showing a routine for assistance in explaining the control operation by which the test vehicle can be driven automatically in a predetermined mode. This routine is stored in a CPU of the personal computer 55.

Control first reads the current engine speed $N_e$ and the actual vehicle speed V as a feedback data (in step S1). Control reads command vehicle speed V according to the time elapsed after a predetermined mode travel has started with reference to command vehicle speed data stored in the memory unit and further calculates change speed $\alpha$ (acceleration or deceleration) for the command vehicle speed V (in step S2). The function at this step S2 corresponds to change speed calculating means 9 shown in FIGS. 2(a) and 2(b).

Control interpolates and calculates the steady travel loss horsepower at the command vehicle speed V with reference to the table indicative of the relationship between vehicle speed and steady travel loss horsepower (mechanical loss including both the dynamometer and the test vehicle) as shown in FIG. 4 (in step S3).

Control calculates a necessary horsepower PS by adding the calculated steady travel loss horsepower and an acceleration loss horsepower calculated in accordance with the third term of the formula (1) (in step S4). The function at these steps S3 and S4 corresponds to necessary power calculating means 10 shown in FIGS. 2(a) and 2(b).

Control interpolates and calculates the friction loss horsepower (F) at the current engine speed $N_e$ with reference to the table indicative of the relationship between current engine speed $N_e$ and the friction loss horsepower F as shown in FIG. 7 (in step S5). The function at the step S5 corresponds to friction loss power calculating means 25 shown in FIG. 2(b). Further, the function of this table can be obtained by loss power-engine speed table storing means 24 shown in FIG. 2(b).

Control calculates an addition of PS+F obtained at steps S4 and S5 (in step S6). This function corresponds to addition calculating means 27 shown in FIG. 2(b).

Control checks whether Ps+F≧0 or not (in step S7). If YES, control determines that the engine can be decelerated by only engine brake and proceeds to step S8. If NO, control determines that the engine must be decelerated by depressing the brake pedal in addition to the engine brake and proceeds to step S15. The function at step S7 corresponds to discriminating means 28 shown in FIG. 2(b).

Control further checks whether PS≧0 or not (in step S8). If YES, control determines that the engine must be accelerated or kept at a steady state, and proceeds to step S9. If NO, control determines that the engine must be decelerated and proceeds to step S12. The function at step S8 corresponds to acceleration/steady state discriminating means 11 shown in FIG. 2(a) or deceleration discriminating means 26 shown in FIG. 2(b).

Control converts the necessary horsepower PS calculated at step S4 into an engine output torque T in accordance with the formula (2) and on the basis of the engine speed $N_e$ (in step S9). This function at step S9 corresponds to torque converting means 12 shown in FIG. 2(a).

Control interpolates and calculates an accel actuator stroke required to generate the torque T obtained at step S9 according to the current engine speed $N_e$ with reference to the table indicative of the relationship between accel actuator stroke and engine output torque as shown in FIG. 5(a) or 5(b) (in step S10). This function at step S10 corresponds to stroke calculating means 13 shown in FIG. 2(a). The function of this table can be obtained by stroke-torque table storing means 7 shown in FIG. 2(a).

Control outputs the accel actuator stroke obtained at step S10 to the accel actuator as a command stroke (in step S11). This function corresponds to stroke commanding means 14 shown in FIG. 2(a) or 2(b).

Further, control interpolates and calculates a stroke $S_N$ at no-load engine speed with reference to the table indicative of the relationship between engine speed and accel actuator stroke as shown in FIG. 6 (in step S12) and a command stroke $S_x$ required to decelerate the engine is calculated in accordance with the formula (4) (in step S13). Further, control corrects the command stroke $S_x$ calculated at step S13 on the basis of a difference $\Delta V$ between the command vehicle speed V and the actual vehicle speed in accordance with the following formula (in step S14):

$$S = S_x + K \Delta V \tag{5}$$

where K denotes a constant. The above correction is made to reduce a small error due to linear approximation (interpolation calculation). The functions at steps S12 to S14 correspond to accel stroke calculating means 29 shown in FIG. 2(b).

Further, if PS+F<0 (in step S7), control determines that the engine speed cannot be decelerated by only releasing the accel pedal and therefore proceeds to step S15. In step S15, a command stroke is given to the brake actuator (brake pedal actuating air cylinder) to decelerate the engine speed by actuating the brake pedal by a predetermined stroke. This function corresponds to stroke calculating means 30 and stroke commanding means 31 shown in FIG. 2(b).

The operation of the automatic vehicle driving system will be explained hereinbelow.

Before automatically driving a test vehicle on a chassis dynamometer, a table indicative of the relationship between engine output torque required to drive the vehicle at predetermined actual speed and change speed (acceleration or deceleration) and accel actuator stroke necessary to generate the required engine output torque is stored with engine speed as parameter in the memory unit of the personal computer 55 by teaching operation, for each test vehicle.

In automatic travelling, CPU of the personnel computer 55 discriminates whether the engine must be accelerated, decelerated or kept at a steady state on the basis of command vehicle speed and change speed both designated according to each travel mode, and calculates an engine output torque T required at each occasion. Further, CPU determines the accel actuator stroke required to generate the engine output torque T with reference to the above-mentioned stroke-torque table as shown in FIG. 5(a) or 5(b). The determined stroke is commanded to the accel actuator to generate required engine output torque (e.g. for acceleration, deceleration or steady travel).

On the other hand, when the vehicle speed is required to be decelerated in travel mode, it is discriminated whether the vehicle speed is decelerated by only engine brake or by depressing the brake pedal in addition to engine brake. That is, only when the vehicle speed cannot be decelerated by only the engine brake, the brake pedal is depressed. Conventionally, the vehicle speed is often decelerated by depressing the brake pedal even when the vehicle speed can be decelerated by only engine brake. In the system according to the present invention, it is possible to prevent the brake mechanism from being worn off without wastefully depressing the brake pedal.

Further, conventionally, when the vehicle speed can be decelerated by only applying engine brake, since a negative engine output torque is obtained from a negative necessary horsepower through complicated calculations, so that the response speed is slow and the system configuration is complicated. In the present invention, however, since the command stroke of the accel actuator at deceleration can be obtained by approximate calculation in accordance with the formula (4), no complicated calculations are required, so that the response speed can be improved and the system configuration can be simplified.

Further, in the case of an engine provided with a warming-up system, the idling engine speed is increased by a predetermined value (e.g. 1500 rpm) during warming-up engine running, under the condition that the accel pedal position is kept at the same idling position. Therefore, when the command accel actuator stroke is obtained with reference to the stroke-torque table formed by teaching operation after warming-up running, the response characteristics to the command vehicle speed deteriorate.

In this case, however, it is possible to simply correct the accel actuator stroke during warming-up running as follows: when the engine is running for warming-up operation, engine power PSD (Ps) necessary at warming-up is obtained with reference to a table indicative of the relationship between vehicle speed and loss horsepower as shown in FIG. 4 in accordance with interpolation calculation, and a table between the generated engine power PSD and time elapsed t is formed to obtain a function PSD (t) of PSD with respect to time t. Therefore, it is possible to calculate an offset value PSH (Ps) of the horsepower t sec after the engine has been started as follows:

$$PSH = PS - PSD(t) \qquad (6)$$

That is, in the travel mode after engine start, the above offset horsepower PSH is added to the necessary horsepower PS at step S4 shown in FIG. 9 to correct the warming-up engine running. However, since the PSD(t) changes according to travel conditions, it is more practical to obtain each PSD(t) for each travel mode.

In the above-mentioned control, since the engine output torque is controlled in open-loop manner on the basis of the stored table data (not a feedback control on the basis of actual vehicle speed), it is unnecessary to adjust the control gain for each test vehicle, thus markedly reducing the setting time for each test vehicle.

In addition, when the chassis dynamometer conditions (e.g. inertia-equivalent weight) changes according to the difference between the travel modes, it is possible to adjust the above-mentioned table data by only entering the chassis dynamometer conditions through a keyboard of the personal computer according to each travel mode. In other words, the conventional complicated control gain adjustment work performed by the operator according to each test vehicle and each travel mode can be replaced with the table forming work by teaching operation, and further the table forming work can be performed by the personal computer. Therefore, it is possible to markedly reduce the setting work for vehicle travel test.

The system according to the present invention has been explained of where test vehicles are driven in various travel modes, by way of example. Without being limited thereto, however, it is also possible to test various dynamic performance of a vehicle on which load is mounted, by only modifying the command vehicle speed data so as to correspond to the required tests.

As described above, in the first aspect of the present invention, when the vehicle speed is accelerated or kept at steady state, since the relationship between the engine output torque and the accel actuator stroke to generate the torque is formed into a numerical table by teaching operation and further the command stroke is determined with reference to the formed stroke-torque table after the vehicle has been driven in automatic travel mode in accordance with the command vehicle speed data, it is possible to markedly simplify the setting work for vehicle test.

In the second aspect of the present invention, when the vehicle speed is decelerated, since the relationship between the engine speed and the friction loss power is formed into a numerical table by teaching operation and further the deceleration possibility by only engine brake can be discriminated on the basis of the table, it is possible to brake the vehicle by depressing the brake pedal only when the vehicle speed cannot be decelerated by only engine brake, so that it is possible to minimize the braking operation.

What is claimed is:

1. An automatic vehicle driving system on a chassis dynamometer, comprising:
   (a) means for sensing engine speed;
   (b) means for sensing vehicle speed;
   (c) means for calculating vehicle change speed on the basis of sensed vehicle speed;
   (d) means for actuating an accelerator pedal;
   (e) means for forming a table indicative of a relationship between accelerator actuator stroke and engine output torque on the basis of the sensed engine speed, the sensed vehicle speed, and the calculated vehicle change speed;
   (f) means for storing the formed stroke-torque table;
   (g) means for storing command vehicle speed data;
   (h) means for calculating command vehicle change speed;
   (i) means for calculating necessary power to drive a vehicle at the command vehicle speed and the command vehicle change speed;
   (j) means for discriminating whether the vehicle must be accelerated or kept at steady speed on the basis of the calculated necessary power;
   (k) means for converting the calculated necessary power into an engine output torque according to the sensed engine speed when the vehicle must be accelerated or kept at steady speed;
   (l) means for calculating an accelerator actuator stroke required to generate the converted engine output torque with reference to the stroke-torque table formed by said stroke-torque forming means; and
   (m) means for controlling said accelerator pedal actuating means responsive to the calculated accelerator actuator stroke.

2. The automatic vehicle driving system of claim 1, which further comprises:
   (a) means for actuating a brake pedal;
   (b) means for forming a table indicative of a relationship between engine friction loss power and engine speed on the basis of the sensed engine speed, the sensed vehicle speed, and the calculated vehicle change speed;
   (c) means for storing the formed friction loss power-engine speed table;
   (d) means for calculating a friction power loss according to the current engine speed with reference to the formed friction loss power-engine speed table;
   (e) means for discriminating whether the vehicle speed must be decelerated on the basis of the calculated necessary power;
   (f) means for calculating an addition of the calculated necessary power to the calculated friction loss power when the vehicle must be decelerated;
   (g) means for discriminating whether the vehicle speed can be decelerated by only engine brake or not on the basis of the added power;
   (h) means for calculating an accelerator actuator stroke when the vehicle speed can be decelerated by only engine brake;

(i) means for calculating a brake actuator stroke when the vehicle speed cannot be decelerated by only engine brake; and (j) means for controlling said brake pedal actuating means responsive to the calculated brake actuator stroke.

3. The automatic vehicle driving system of claim 1, wherein the engine output torque is determined in an open-loop control manner.

4. A method of driving a vehicle on a chassis dynamometer, comprising the steps of:

(a) reading actual engine speed and actual vehicle speed;

(b) reading a stored command vehicle speed and calculating a change speed on the basis of the command vehicle speed;

(c) calculating a necessary power PS with reference to a stored vehicle speed-steady travel power table;

(d) calculating an engine friction loss power F with reference to a stored friction loss power-engine speed table;

(e) calculating an addition PS+F of the calculated necessary power and the calculated friction power;

(f) checking whether the calculated addition is equal to or more than zero $PS+F \geq 0$;

(g) if equal to or more than zero, determining that vehicle speed can be decelerated by only engine brake;

(h) checking whether the calculated necessary power is equal to or more than zero $PS \geq 0$;

(i) if equal to or more than zero, determining that vehicle speed must be accelerated or kept at steady speed;

(j) converting the necessary power PS into an engine output torque T according to the current engine speed;

(k) calculating an accelerator actuator stroke with reference to a stored stroke-torque table; and, (l) outputting a calculated command accelerator actuator stroke to an accelerator actuator.

5. The method of claim 4, which further comprises the step of:

(a) if the calculated addition is less than zero as $PS+F<0$ in step (f) of claim 4, determining that vehicle speed must be decelerated by both engine brake and brake pedal; and (b) outputting a calculated brake actuator stroke to a brake actuator.

6. The method of claim 4, which further comprises the step of:

(a) if the calculated necessary power is less than zero $PS<0$ in step (f) of claim 4, determining that vehicle speed must be decelerated and calculating an accelerator actuator stroke $S_N$ according to no-load engine speed with reference to a stored engine speed-actuator stroke table in accordance with interpolation method;

(b) calculating a command accelerator actuator stroke $S_x$ on the basis of the Calculated stroke SN in accordance with linear approximation interpolation method; and (c) correcting the calculated command stroke $S_x$ on the basis of a difference between actual vehicle speed and command vehicle speed, before, outputting the calculated command stroke to the accelerator actuator.

7. The method of claim 4, wherein the stored accelerator actuator stroke-engine torque is formed by the steps of:

(a) changing accelerator actuator stroke from a predetermined steady vehicle speed;

(b) measuring vehicle speed and vehicle change speed;

(c) calculating engine output power PS including a rolling resistance power, windage loss resistance power, and an acceleration resistance power; and (d) converting the calculated engine output power PS into engine output torque T according to at least one engine speed to form at least one accelerator actuator stroke-engine output torque table.

8. The method of claim 7, wherein the accelerator actuation stroke-engine torque tables are formed at high, medium and low engine speeds.

9. The method of claim 8, wherein in the case of a vehicle provided with an automatic transmission, the stroke-torque table obtained at relatively high engine speed is corrected by parallel shifting the table characteristics obtained on the basis of no-load engine speed stroke to obtain stroke-torque tables at medium and low engine speed.

10. The method of claim 4, wherein the friction loss power-engine speed table is formed by the steps of:

(a) returning accelerator actuator stroke to an idling position;

(b) measuring the vehicle speed and the deceleration rate;

(c) calculating deceleration power $PS_\alpha$ including a rolling resistance power and windage loss resistance power;

(d) calculating engine friction power F by subtracting steady travel loss power $PS_{R/L}$ to form an engine friction loss power-engine speed table.

11. The method of claim 4, wherein the calculations with reference to tables are executed in accordance with interpolation methods.

12. The method of claim 4, wherein when the engine is being warmed up, the necessary power PS is corrected by the steps of:

(a) forming a table indicative of relationship between vehicle speed and steady travel loss power;

(b) obtain warm-up engine output power PSD(t) as a function with respect to time elapsed after the engine has been started;

(c) calculating the difference PSH between the engine output power PS and the warm-up engine output power PSD(t), and (d) adding the calculated difference PSH to the necessary power PS at step (c) of claim 4.

13. An automatic vehicle driving system on a chassis dynamometer, comprising:

(a) means for sensing engine speed;

(b) means for sensing vehicle speed;

(c) means for calculating vehicle change speed on the basis of sensed vehicle speed;

(d) means for actuating an accelerator pedal;

(e) means for actuating a brake pedal;

(f) means for forming a table indicative of a relationship between engine friction loss power and engine speed on the basis of the sensed engine speed, the sensed vehicle speed, and the calculated vehicle change speed;

(g) means for storing the formed friction loss power-engine speed table;

(h) means for calculating a friction power loss according to the current engine speed with reference to the formed friction loss power-engine speed table;
(i) means for storing command vehicle speed data;
(j) means for calculating command vehicle change speed;
(k) means for calculating necessary power to drive a vehicle at the command vehicle speed and the command vehicle change speed;
(l) means for discriminating whether the vehicle speed must be decelerated on the basis of the calculated necessary power;
(m) means for calculating an addition of the calculated necessary power to the calculated friction loss power when the vehicle must be decelerated;
(n) means for discriminating whether the vehicle speed can be decelerated by only engine brake or not on the basis of the added power;
(o) means for calculating an accelerator actuator stroke when the vehicle speed can be decelerated by only engine brake;
(p) means for calculating a brake actuator stroke when the vehicle speed cannot be decelerated by only engine brake;
(q) means for controlling said accelerator pedal actuating means responsive to the calculated accelerator actuator stroke; and
(r) means for controlling said brake pedal actuating means responsive to the calculated brake actuator stroke.

14. An automatic vehicle driving system on a chassis dynamometer, comprising:
(a) means for sensing engine speed;
(b) means for sensing vehicle speed;
(c) means for calculating vehicle change speed on the basis of sensed vehicle speed;
(d) means for actuating an accelerator pedal;
(e) means for forming a table indicative of a relationship between accelerator actuator stroke and engine output torque on the basis of the sensed engine speed, the sensed vehicle speed, and the calculated vehicle change speed;
(f) means for storing the formed stroke-torque table;
(g) means for storing command vehicle speed data;
(h) means for calculating command vehicle change speed;
(i) means for calculating necessary power to drive a vehicle at the command vehicle speed and the command vehicle change speed, in accordance within the following formula:

$$PS = K_1\mu_r WV + K_2\mu_c \{\rho/(2g \times 3.6^2)\} A V^3$$

where
PS: necessary horsepower (Ps)
$K_1$, $K_2$: constants
$\mu_r$: tire rolling resistance coefficient
W: vehicle weight (kgf)
V: vehicle speed (km/h)
$\mu_c$: air resistance coefficient
A: vehicle front projection area (m$^2$)
$\rho$: air density (kg/m$^3$)
g: gravity acceleration (m/s$^2$)
(j) means for discriminating whether the vehicle must be accelerated or kept at steady speed on the basis of the calculated necessary power;
(k) means for converting the calculated necessary power into an engine output torque according to the sensed engine speed when the vehicle must be accelerated or keep at steady speed;
(l) means for calculating an accelerator actuator stroke required to generate the converted engine output torque with reference to the stroke-torque table formed by said stroke-torque forming means; and
(m) means for controlling said accelerator pedal actuating means responsive to the calculated accelerator actuator stroke.

15. A method of driving a vehicle on a chassis dynamometer, comprising the steps of:
(a) reading actual engine speed and actual vehicle speed;
(b) reading a stored command vehicle speed and calculating a change speed on the basis of the command vehicle speed;
(c) calculating a necessary power PS with reference to a stored vehicle speed-steady travel power table calculated in accordance with the following formula:

$$PS = K_1\mu_r WV + K_2\mu_c \{\rho/(2g \times 3.6^2)\} A V^3$$

where
PS: necessary horsepower (Ps)
$K_1$, $K_2$: constants
$\mu_r$: tire rolling resistance coefficient
W: vehicle weight (kgf)
V: vehicle speed (km/h)
$\mu_c$: air resistance coefficient
A: vehicle front projection area (m$^2$)
$\rho$: air density (kg/m$^3$)
g: gravity acceleration (m/s$^2$)
(d) calculating an engine friction loss power F with reference to a stored friction loss power-engine speed table;
(e) calculating an addition PS+F of the calculated necessary power and the calculated friction power;
(f) checking whether the calculated addition is equal to or more than zero PS+F≧0;
(g) if equal to or more than zero, determining that vehicle speed can be decelerated by only engine brake;
(h) checking whether the calculated necessary power is equal to or more than zero PS≧0;
(i) if equal to or more than zero, determining that vehicle speed must be accelerated or kept at steady speed;
(j) converting the necessary power PS into an engine output torque T according to the current engine speed;
(k) calculating an accelerator actuator stroke with reference to a stored stroke-torque table; and,
(l) outputting a calculated command accelerator actuator stroke to an accelerator actuator.

* * * * *